United States Patent Office 3,467,600
Patented Sept. 16, 1969

3,467,600
COMBINATION OPTICAL BRIGHTENER FOR TEREPHTHALIC ACID POLYESTER FIBERS
Reinhard Zweidler, Basel, and Max Keller, Riehen, Switzerland, assignors to Geigy Chemical Corporation, Greenburgh, N.Y., a corporation of Delaware
No Drawing. Original application May 24, 1965, Ser. No. 458,448, now Patent No. 3,416,945, dated Dec. 17, 1968. Divided and this application July 24, 1968, Ser. No. 747,118
Claims priority, application Switzerland, May 29, 1964, 7,060/64, 7,061/64
Int. Cl. C09k 1/02; C11d 3/42
U.S. Cl. 252—301.2   8 Claims

ABSTRACT OF THE DISCLOSURE

Improved brightener compositions comprising 2-[4'''-chlorine - 2'' - cyanostilbyl-4'']-(naptho-1',2':4,5)-1,2,3-triazole and at least one other brightener compound which forms colorless blue fluorescent solutions and contains no stilbene groups and has at least one hetero atom fused with a benzene ring selected from coumarin, benzoxazole or napthalic acid amides in which the 2-[4'''-chlorine - 2'' - cyanostilbyl-4'']-(naptho-1',2':4,5)-1,2,3-triazole is present in a weight ratio of from 1:5 to 2:1 in relation to the other brightener components. Also optically brightened terephthalic acid polyester fibers which have been impregnated with 2-[4'''-chlorine-2''-cyano-stilbyl-4''] - (naphtho - 1',2':4,5)-1,2,3-triazole which have been heated at preferably 180 to 220° C. to achieve a white to reddish-white whiter-white effect.

CROSS REFERENCE TO RELATED APPLICATION

The present application is a divisional application to copending application Ser. No. 458,448 filed on May 24, 1965, now Patent No. 3,416,945, issued Dec. 17, 1968.

THE INVENTION

The present invention concerns a process for the optical brightening of fibers containing terephthalic acid polyesters as well as, as industrial product, the fiber materials brightened according to the invention.

It is known that 2-[4'''-chlorine-2''-cyanostilbyl-4'']-(naptho - 1',2':4,5) - 1,2,3 - triazole is well suited for brightening fibers containing polyesters of terephthalic acid in the spinning mass. However, attempts to optically brighten such fibers also by an exhaustion process have not led to satisfactory results because the brightening effects on this material were much weaker than those achieved by the first-mentioned method of incorporation.

On the other hand, it is known to brighten polyester fibers especially of the Dacron type with optical brighteners of the oxazole and the like types, by methods corresponding to those of the well-known pad-dyeing process, i.e. by impregnation of the goods on a pad mangle (foularding) at room temperature (about 15 to 40° C.), removal of an excess of the impregnating liquor and subsequent drying and developing by exposure to a higher temperature, in the range of 140–220° C. for a short time, up to about one minute. However, this method was considered undesirable for application of optical brighteners of the triazolylstilbene class, because brighteners of the latter class generally showed a noticeable decrease or even deterioration of the white effect when used with polyester fibers under the conditions of the pad-dyeing process. Moreover, some brighteners of this class caused a greenish hue in the white of the brightened fabrics, while a neutral white to reddish (or very faint violet) hue of the white, i.e. a "whiter" white, is usually preferred, and great efforts have been made by the industry to avoid the former and achieve the latter.

It has now been found that surprisingly strong beautifully brilliant, very faintly reddish brightenings are obtained on terephthalic acid polyester fiber material by impregnating the material under conditions corresponding to those of the pad dyeing process, with an aqueous pad liquor, which contains the compound of the formula

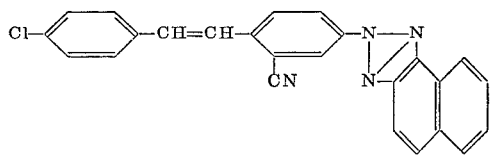

at room temperature (about 15 to 40° C.), squeezing out the impregnated goods and then heating them at higher temperatures, in the above-stated range, to achieve drying and development of the "whiter" white effect.

This is all the more surprising as the brightening effect of other brightening agents for polyester fibers is not as good when they are applied by the pad dyeing process as opposed to the exhaustion process.

The compound of Formula I has been described in American Patent No. 2,972,611.

The aqueous brightening dispersion to be used as pad liquor accordng to the invention contains about 0.5 to 6 g. per liter of finely distributed brightener of Formula I. The particle size of the brightener in the dispersion should be about 1 to 5µ or even less. The fine degree of distribution of the brightener is attained by the usual methods, advantageously by milling with sand and in the presence of water and a dispersing agent, e.g. a condensation product of naphthalene sulfonic acid and formaldehyde. The amount of the dispersing agent is about 1/30 to 1/10 calculated on the weight of the brightener used. In addition, the dispersion advantageously contains dispersing or emulsifying agents, e.g. fatty alcohol polyglycol ethers such as stearyl alcohol polyglycol ethers having 8 to 10 ethyleneoxy groups, or it contains protective colloids such as high polymeric polyacrylates or polyacrylamides such as the commercial product Separan AP (sold by Dow Chemical, USA) or Irgamin E (sold by Geigy, Basel, Switzerland), also thickeners such as alginates or cellulose derivatives, e.g., carboxyalkyl cellulose derivatives such as carboxymethyl cellulose or alkyl cellulose derivatives such as methyl cellulose.

Mainly, fabrics which consist exclusively of polyesters are used as "fibers containing terephthalic acid polyesters," for example, fabrics made of poly-(1,2-ethyleneglycol)-terephthalic acid esters such as the commercial products Dacron (E. I. du Pont de Nemours, Wilmington, Del.), Terylene (Imperial Chemical Industries, Ltd., London, England), Trevira (Farbwerke Hoechst A.G., Frankfurt am Main, Germany), Diolen (Vereinigte, Glanzstoff AG., Wuppertal, Germany) or Tergal (Rhodiaceta, Lyons, France), but also fabrics made of poly- (1,4-cyclohexyleneglycol)-terephthalic acid esters, e.g. the commercial product Kodel (Tennessee Eastman, Kingsport, Tenn.) are used. Mixed fabrics consisting of terephthalic acid polyesters and other fibers, namely fibers containing hydroxyl groups, particularly cotton, can also be used.

On using such mixed fabrics, only the polyterephthalic acid part is brightened. If it is desired to brighten the other component as well, then a brightening pad liquor is used which, in addition to the components mentioned above also contains an optical brightener suitable for the brightening of this component of the fabric. If the fabric is of the preferred mixture of polyterephthalate and cotton, then the cotton part is advantageously optically brightened with a brightener from the class of 4,4'-bis-(triazinylamino)-stilbene disulfonic acids, e.g. with one of the brighteners described in U.S. Patent No. 2,473,475.

The goods are impregnated with the brightening dispersion by the usual methods, advantageously on a pad-mangle. The impregnated material is advantageously squeezed so that its remaining liquor content is from 40 to 100%, calculated on the dry weight of the material. The squeezed goods are then, optionally after an intermediate drying, heated to higher temperatures, advantageously with hot air at 180–220° C.

Fibers containing terephthalic acid polyesters brightened according to the invention are distinguished by a greatly improved, very faintly reddish white appearance in daylight and this white shading has good fastness to light.

As has been mentioned above, it is known to brighten fibers containing polymeric esters of terephthalic acid with finely dispersed optical brightening agents which contain no water solubilizing groups and in the molecule contain at least one heterocyclic ring fused to a benzene ring, e.g. of the benzoxazole class and the like, by impregnating the fibers on a pad mangle and heating them to develop the brightening effect. The compounds used hitherto as brighteners for these fibers produce pale blue to blue-green hued white shades and a limited maximal brightening effect.

It has now been found that a neutral, strong white shade can be given to fibers containing polymeric esters of terephthalic acid by impregnating such fiber materials with a pad liquor which is the aqueous suspension of a mixture of finely dispersed optical brighteners containing no acid, salt-forming groups, and heating the impregnated goods at higher temperatures. This mixture of brighteners according to the invention consists of the above-mentioned stilbene compound of Formula I and of at least one compound having affinity to polyesters, which compound forms colorless, blue-fluorescent solutions, contains no stilbene groups and contains at least one hetero ring fused with a benzene ring.

Compared with the maximal theoretically possible brightening of the components of the mixture, the mixtures according to the invention cause a surprising, unexpected rise in the strength of the brightening effect. Compounds having affinity to polyesters and which form colorless, blue-fluorescent solutions, contain no stilbene groups and contain at least one hetero ring fused with a benzene ring, are mainly derivatives of the coumarin, the benzoxazole or the naphthalic acid imide series.

Suitable brighteners containing the coumarin ring are chiefly derivatives of 3-phenyl-7-aminocoumarin; of these the 3-phenyl coumarin compounds substituted in the 7-position by the 3-methyl-pyrazolyl-(1), the naphtho-(1',2':4,5)-triazolyl-(2) or the 4-chloro-6-diethylamino-1,3,5-triazinyl-(2) radical are particularly suitable.

Suitable compounds containing a benzoxazole ring are e.g. the bis-benzoxazolyl-(2')-ethylenes and -2,5-thiophenes.

Examples of suitable naphthalic acid imides are 4-alkoxy-naphthalic acid-N-methyl-imide or 4-acetamino naphthalic acid-N-butyl-imide.

In the brightening mixture to be used according to the invention, the weight ratio of the brightener of Formula I to the other components as defined is advantageously from about 1:5 to 2:1 preferably up to about 1:1. The particle size of the brightener should be about 1 to $5\mu$, or even less. The necessary degree of distribution of the brightener is attained by the usual methods described hereinbefore. The aqueous suspension of the active substances to be used as pad liquor in this aspect of the invention, preferably contains 0.3 to 5 g. per liter of the brightening mixture and also, advantageously, emulsifying agents, such as the known commercial products Separan AP or Irgamin E as well as thickeners, all mentioned in the foregoing.

The goods are impregnated with the brightening suspension on a pad mangle and further treated in the manner described hereinbefore.

Fibers containing polyesters of terephthalic acid brightened according to the invention show a similar greatly improved white appearance in daylight and this white shade has similar good fastness to light as the brightened polyester materials obtained by the treatment described under the first aspect of this invention.

Further details of the invention can be seen from the following non-limitative examples. Temperatures are given therein in degrees centigrade. Percentages and parts are given by weight.

Example 1

A white ethyleneglycol terephthalate polyester fabric (Dacron) is impregnated on a pad mangle at 25° C. with a pad liquor containing 2 g. of the brightening agent of Formula I in 1000 ml. of water. The fabric is squeezed to leave a liquor content of 50% (calculated on the fiber dry weight) thereon given an intermediate drying at 60° in a hot air stream, and then developed by passing it for 30 seconds through a heat chamber at 210–220°. The fabric so treated shows a very strong, brilliant white effect.

The pad liquor used is produced as follows:

30 parts of the brightener, with the addition of 2 parts of sodium methylene-bis-(naphthalene sulfonate) (commercially available under the trade name of Belloid TD) as dispersant, in 70 parts of water are milled with sand until a particle size of at most $5\mu$ to smaller than $1\mu$ is attained. Water and 100 parts of a thickener consisting of a stearyl alcohol polyglycol ether having about 9 ethyleneoxy groups are added to this 30% paste and the whole is diluted to 1000 parts so that a 10% paste is obtained. 20 parts of this 10% paste are then diluted with water to 1000 parts and the suspension obtained is used for the processing in the foulard described in the above example.

Similar results are obtained with a pad liquor which contains 12 parts of a high polymeric polyacrylamide thickener in lieu of the polyglycol ether thickener used as described above.

Example 2

A white blended fabric consisting of 67% poylethylene glycol terephthalate and 33% cotton which has previously been bleached with sodium chlorite, is impregnated at 25° on a pad mangle with a pad liquor produced according to Example 1.

The fabric is squeezed to a liquor content of about 60%, calculated on the dry fabric weight, then given an intermediate drying at 60° and finally developed for 2½ minutes at 180°. The fabric thus treated has a beautiful brilliant white appearance in daylight.

Example 3

A blended fabric consisting of 67% polyethylene glycol terephthalate and 33% cotton, which has been previously bleached with hydrogen peroxide, is impregnated at 25° in a foulard with a suspension obtained analogously to Example 1 which contains 2 g. of the brightener of Formula I and 0.5 g. of the brightener of the formula

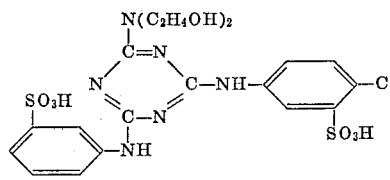 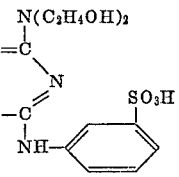

(II)

in 1000 ml. of water. The fabric is squeezed to a liquor content of 60% calculated on the dry fabric weight, given an intermediate drying at 60° and then developed for 2½ minutes at 180°. The fabric thus treated shows a very strong, brilliant white effect in daylight.

A similar brightening effect is obtained if the bis-triazinylaminostilbene compound of Formula II is replaced by the compound of the formula:

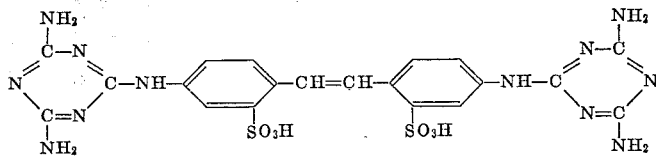 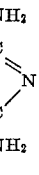

(III)

and otherwise the procedure given in Example 3 is followed.

Example 4

An unbleached mixed fabric consisting of 65% polyethylene glycol terephthalate and 35% cotton is impregnated at 20° on a pad mangle with a suspension produced according to Example 1 containing 1.5 g. of the brightening agent of Formula I in 1000 ml. of water. The fabric is then wrung out to a liquor content of 50% based on the dry fabric weight and passed through a tentering frame which is so adjusted that the fabric is first pre-dried at 100° and is then heated for 30 seconds at 210°. The fabric thus treated is quite clearly brown colored and, as yet, has no visual white effect. It is then bleached on a covered jigger with an 85°-hot aqueous solution which contains 3 ml. of 30% hydrogen peroxide, 1 ml. of aqueous sodium silicate solution (38° Bé.), 0.25 g. of sodium hydroxide and 0.06 g. of the brightener of the formula:

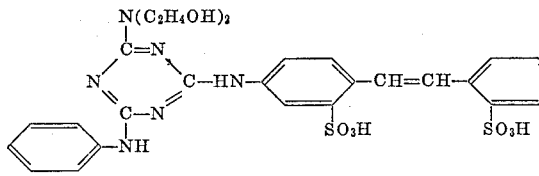 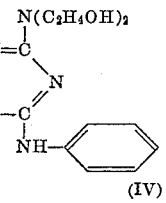

in 1000 ml. of water. The fabric is then thoroughly rinsed, first with warm and then with cold, water and afterwards dried at a temperature of 50–80°. After this treatment both fibers in the mixed fabric show a strong, brilliant white effect.

Example 5

A polyethyleneglycol terephthalate fabric (Dacron) is padded at 25° with a suspension containing 1.2 g. of the brightener of the formula

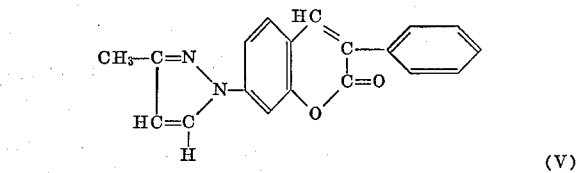

(V)

and 0.8 g. of the brightener of Formula I in 1000 ml. of water. The goods are squeezed to a liquor content of 50% on the dry fabric weight, given an intermediate drying at 60° and then developed for 30 seconds at 210–220°. By this treatment the fabric is given a strong, brilliant white effect which has very good fastness to light.

The suspension used is produced as follows:

30 parts of the mixture of brighteners of the weight ratio given above and about 2 parts of sodium methylene bis(naphthalene sulfonate) in 70 parts of water are milled with sand until a particles size of at most 5 microns to less than 1 micron is attained. To 330 parts of the 30%-paste thus obtained there are added: Water and 100 parts of a thickener consisting of a stearyl alcohol polyglycol ether having about 9 ethyleneoxy groups, and the whole is diluted to 1000 parts so that a paste having a 10% content of the brightener mixture is obtained. 20 parts of this 10%-paste are then diluted with water up to 1000 parts and the suspension so obtained is used on a pad mangle as described in the preceding example.

Similar effects of shade and fastness to light are obtained by changing the ratio of the two brighteners of 1.2 g.:0.8 g. given in Example 5 to 0.8 g.:1.2 g.; to 1 g.:1 g.; to 1.4 g.:0.6 g.; to 1.6 g.:0.4 g., respectively, and otherwise following the procedure described in the said example.

Example 6

A mixed fabric made of 67% polyethylene glycol terephthalate and 33% cotton which has been previously bleached with sodium chlorite, is padded at 25° with a pad liquor obtained according to Example 5 which contains 1.2 g. of the brightener of Formula V and 0.8 g. of the brightener of Formula I, in 1000 ml. of water.

The fabric is squeezed to a liquor content of about 60% of the dry fabric weight, given an intermediatae drying at 60°, and then developed for 2½ minutes at 180°. The resulting fabric has a beautiful, brilliant white effect in daylight of very good fastness to light.

Example 7

A mixed fabric made of 67% polyethylene glycol terephthalate and 33% cotton which has been previously bleached with sodium chlorite or hydrogen peroxide, is impregnated at 25° on a pad mangle with a liquor produced analogously to Example 5, but which contains 1.2 g. of the brightener of Formula V, 0.8 g. of the brightener of Formula I, and 0.5 g. of the brightener of Formula II, in 1000 ml. of water. The fabric is squeezed to a liquor content of about 60% of the dry fabric weight, given an intermediate drying at 60°, and developed for 2½ minutes at 180°. The fabric so treated has a very strong, brilliant white effect in daylight, which has very good fastness to light.

A similar brightening effect is obtained when Example 7 is repeated, but the bis-triazinylamino-stilbene compound of Formula II mentioned above is replaced by the compound of Formula III.

Example 8

A Dacron fabric is impregnated on a pad mangle at 25° with a liquor produced analogously to Example 5 from 1.2 g. of the brightening agent of the formula

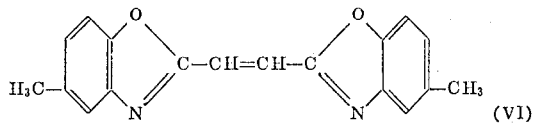

(VI)

and 0.8 g. of the brightening agent of Formula I in 1000 ml. of water.

The fabric is squeezed to a liquor content of 50% (calculated on the dry fabric weight), given an intermediate drying at 60° and then developed for 30 seconds at 210–220°. The resulting fabric shows a very strong, brilliant white effect in daylight, which has very good fastness to light.

Similar brightening effects are obtained when in the above Example 8, instead of the brightener first mentioned therein, there are used 1.2 g. of the brightener of the formula

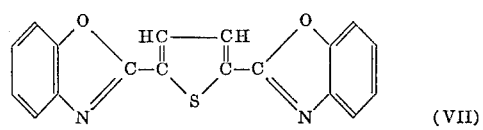

(VII)

and otherwise the procedure given in the example is followed.

Example 9

A Dacron fabric is impregnated on a pad mangle at 25° with a liquor produced analogously to Example 5 from 1.2 g. of the brightener of the formula

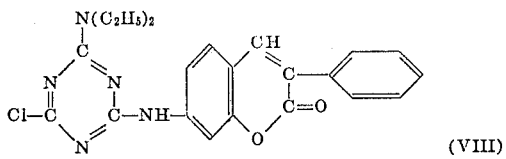

(VIII)

and 0.8 g. of the brightener of Formula I in 1000 ml. of water.

The fabric is squeezed to a liquor content of about 60% of dry fabric weight, given an intermediate drying at 60° and then developed for 30 seconds at 210–220°. By this treatment the fabric is given a strong white effect in daylight which has very good fastness to light. Similar brightening effects are obtained when, in the above example, the brightener first mentioned is replaced by the same amount of the brightener of the formula

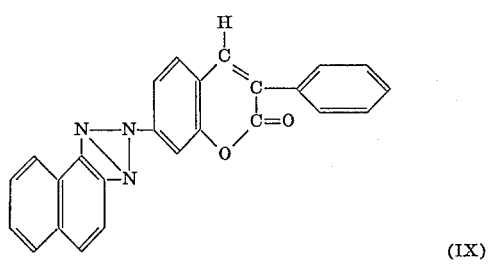

(IX)

and the "white" effect is developed by treating for 40 seconds at 200°.

Example 10

A Dacron fabric is impregnated at 25° on a pad mangle with a liquor produced analogously to Example 5 from 1.2 g. of the brightener of the formula

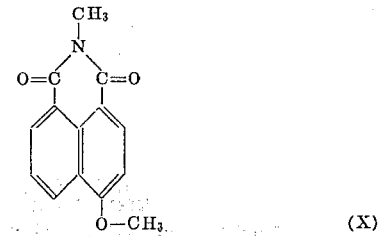

(X)

and 0.8 g. of the brightener of Formula I, in 1000 ml. of water.

The fabric is wrung out to leave a liquor content of 50% based on the dry fabric weight, pre-dried at 60° and then developed for 30 seconds at 210–220°. In daylight, the fabric so treated shows a strong, very light-stable, brilliant white effect.

Similar brightening effects are obtained when in the above example, 1.2 g. of the brightener of the formula

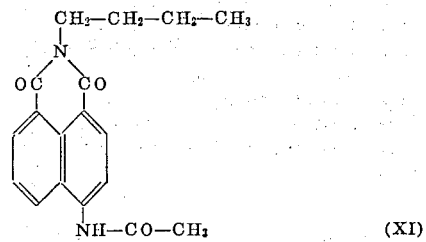

(XI)

are used instead of the brightener of Formula X and otherwise the procedure given in Example 10 is followed.

Example 11

An unbleached blended fabric consisting of 65% polyethylene glycol terephthalate and 35% cotton is impregnated at 20° on a pad mangle with a liquor produced according to Example 1 containing 1.2 g. of the brightener of Formula V and 0.8 g. of the brightener of Formula I in 1000 ml. of water.

The fabric is wrung out to leave a liquor content of 50%, calculated on the dry weight of the fabric, and then passed through a tentering frame which is so adjusted that the fabric is pre-dried at 100° and is afterwards heated for 30 seconds at 210°. The fabric so treated is brown colored and has not yet any visual white effect. It is then bleached on a covered jigger with an aqueous solution, having a temperature of 85°, which contains 3 ml. of 30%-hydrogen peroxide, 1 ml. of sodium silicate solution (38° Bé.), 0.25 g. of sodium hydroxide and 0.06 g. of the brightener of Formula IV in 1000 ml. of water.

The fabric is then thoroughly rinsed, first with warm and then with cold water, and dried at a temperature of 50–80°. After this treatment, both fibers of the blended fabric show a strong, brilliant white effect.

The brightening effects obtainable with different stilbyl naphthotriazoles on poly-ethylene glycol terephthalate fiber material (Dacron) by using the exhaustion method on the one hand, and brightening-by-padding on the other hand, were determined by using, in the former method an exhaustion brightening bath containing 0.1% by weight of the respective brighteners, and in the latter method, a pad liquor containing 2 grams of brightener per liter.

The concentration of the exhaustion bath is the highest one usable without excessive "greening" occurring in the brightened fiber material.

The fluorescence values obtained which are compiled in the following table were measured in a "Fluorometer Type 240" manufactured by E. Schildknecht, of Zürich, Switzerland. Presence or absence of undesirable greening effect is also stated in the table.

| Optical brightener | Brightening effect (in fluorescence values) obtained by— | |
| --- | --- | --- |
| | Exhaustion method | Padding |
| (I) 2-[2″-cyano-stilbyl-(4″)]-(naphtho-1′,2′: 4,5)-1,2,3-triazole. | 90 with slight greening | 83 no greening. |
| (II) 2-[2‴-methoxy-2″-cyano-stilbyl-(4″)]-(naphtho-1′,2′:4,5)-1,2,3-triazole. | 99 with greening | 81 with greening. |
| (III) 2-[4‴-methoxy-2″-cyano-stilbyl-(4″)]-(naphtho-1′,2′:4,5)-1,2,3-triazole. | 98 with greening | 85 strongly greened. |
| (IV) 2-[4‴-chloro-2″-cyano-stilbyl-(4″)]-(naphtho-1′,2′:4,5)-1,2,3-triazole. | 63 unlevel | 95 no greening. |

These data show that, while Brightener IV fails in the exhaustion process, ranging in brightening effect even behind the Compound I which is unsubstituted in the terminal benzene ring of the stilbyl moiety, the said Compound IV yields unexpectedly top effects in pad brightening.

What is claimed is:

1. A composition of matter for the optical brightening of terephthalic acid polyester fiber comprising 2-[4‴-chlorine - 2″ - cyanostilbyl - 4″] - (naphtho - 1′,2′:4,5)-1,2,3-triazole and at least one other brightener compound having an affinity for said polyester which compound forms a colorless blue fluorescent solution, is free of stilbene groups and contains at least one hetero ring fused with a benzene ring and is a derivative of coumarin, benzoxazole or naphthalic acid imides, wherein the weight ratio of said 2-[4‴-chlorine-2″-cyanostilbyl-4″]-(naphtho-1′,2′:4,5)-1,2,3-triazole to the other brightener compound is from about 1:5 to 2:1 by weight.

2. A composition of matter as claimed in claim 1 wherein said other component is a compound of the formula:

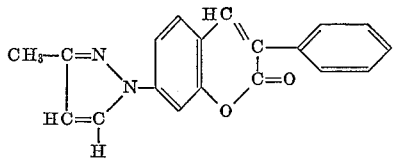

3. A composition of matter as claimed in claim 1 wherein said other component is a compound of the formula:

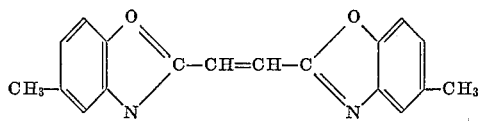

4. A composition of matter as claimed in claim 1 wherein said other component is a compound of the formula:

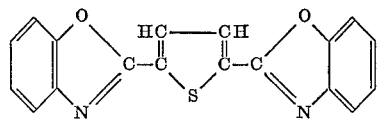

5. A composition of matter as claimed in claim 1 wherein said other component is a compound of the formula:

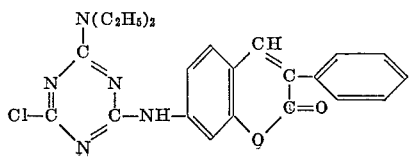

6. A composition of matter as claimed in claim 1 wherein said other component is a compound of the formula:

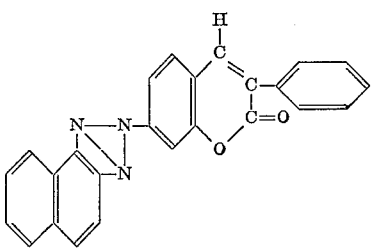

7. A composition of matter as claimed in claim 1 wherein said other component is a compound of the formula:

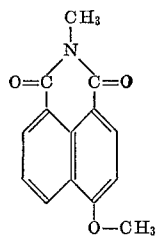

8. A composition of matter as claimed in claim 1 wherein said other component is a compound of the formula:

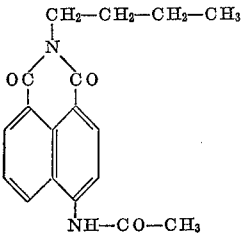

References Cited
UNITED STATES PATENTS 3,366,575    1/1968    Ono et al. _____ 252—301.2

TOBIAS E. LEVOW, Primary Examiner

A. P. DEMERS, Assistant Examiner